United States Patent
Koskinen et al.

(10) Patent No.: US 8,139,559 B2
(45) Date of Patent: Mar. 20, 2012

(54) METHOD AND NETWORK DEVICE FOR ACCOUNTING CHARGEABLE SIGNALING

(75) Inventors: Juha-Pekka Koskinen, Espoo (FI); Juha Vallinen, Espoo (FI)

(73) Assignee: Nokia Corporation, Espoo (FI)

(*) Notice: Subject to any disclaimer, the term of this patent is extended or adjusted under 35 U.S.C. 154(b) by 1213 days.

(21) Appl. No.: 10/451,077

(22) PCT Filed: Dec. 22, 2000

(86) PCT No.: PCT/EP00/13250
§ 371 (c)(1), (2), (4) Date: Nov. 12, 2003

(87) PCT Pub. No.: WO02/052789
PCT Pub. Date: Jul. 4, 2002

(65) Prior Publication Data
US 2004/0077333 A1 Apr. 22, 2004

(51) Int. Cl.
H04L 12/56 (2006.01)
H04L 12/26 (2006.01)
H04M 15/14 (2006.01)
H04M 15/08 (2006.01)
(52) U.S. Cl. .... 370/352; 370/252; 455/406; 379/114.07
(58) Field of Classification Search .................. 370/236, 370/252, 254, 351, 389, 395.1, 395.2, 395.21, 370/395.3, 496, 253, 255, 256, 352–356; 379/112, 114.01–115.01, 115.1; 455/406
See application file for complete search history.

(56) References Cited

U.S. PATENT DOCUMENTS

| | | | | |
|---|---|---|---|---|
| 4,933,931 A * | 6/1990 | Kokubo | | 370/259 |
| 5,008,929 A | 4/1991 | Olsen et al. | | |
| 5,228,080 A * | 7/1993 | Nutter et al. | | 379/373.02 |
| 5,710,807 A * | 1/1998 | Smith | | 379/114.01 |
| 5,751,799 A * | 5/1998 | Mori | | 379/114.09 |
| 5,828,737 A * | 10/1998 | Sawyer | | 379/114.07 |
| 6,061,556 A * | 5/2000 | Rahman | | 455/406 |
| 6,148,191 A * | 11/2000 | Kim | | 455/407 |
| 6,311,054 B1 * | 10/2001 | Korpela | | 455/406 |
| 6,366,577 B1 * | 4/2002 | Donovan | | 370/352 |

(Continued)

FOREIGN PATENT DOCUMENTS

WO    WO 9965186 A1 * 12/1999

(Continued)

OTHER PUBLICATIONS

SIP: Session Initiation Protocol, Handley et al., (Internet Engineering Task Force-Internet-Draft), May 6, 2000.*

(Continued)

*Primary Examiner* — Kwang B Yao
*Assistant Examiner* — Candal Elpenord
(74) *Attorney, Agent, or Firm* — Mintz, Levin, Cohn, Ferris, Glovsky and Popeo, P.C.

(57) ABSTRACT

A network element and a method for accounting chargeable signaling in a communication network. The network includes a signaling message detected in a call processing network element, and an amount of data carried in the signaling message. The amount of data is determined based on a message description provided in the signaling message. The network further includes a counting function, which is selected and updated based on the message description. Accordingly, an inter-operator accounting can be provided even for data carried in signaling messages.

18 Claims, 3 Drawing Sheets

U.S. PATENT DOCUMENTS

| | | | |
|---|---|---|---|
| 6,463,275 B1* | 10/2002 | Deakin | 455/406 |
| 6,496,690 B1* | 12/2002 | Cobo et al. | 455/408 |
| 6,498,838 B1* | 12/2002 | Schoenborn | 379/111 |
| 6,654,606 B1* | 11/2003 | Foti et al. | 455/432.1 |
| 6,741,849 B1* | 5/2004 | Verkama et al. | 455/406 |
| 6,754,311 B1* | 6/2004 | Kampmeier et al. | 379/32.01 |
| 6,967,956 B1* | 11/2005 | Tinsley et al. | 370/466 |
| 6,987,781 B1* | 1/2006 | Miller et al. | 370/496 |
| 6,999,449 B2* | 2/2006 | Barna et al. | 370/352 |
| 7,076,039 B2* | 7/2006 | Ghys | 379/114.28 |
| 2002/0013849 A1* | 1/2002 | Schweitzer et al. | 709/227 |
| 2002/0022471 A1* | 2/2002 | Watler et al. | 455/405 |
| 2002/0034166 A1* | 3/2002 | Barany et al. | 370/329 |
| 2002/0068545 A1* | 6/2002 | Oyama et al. | 455/406 |
| 2002/0127995 A1* | 9/2002 | Faccinn et al. | 455/406 |
| 2004/0078349 A1* | 4/2004 | Syrjala et al. | 705/412 |
| 2005/0026592 A1* | 2/2005 | Walter et al. | 455/406 |

FOREIGN PATENT DOCUMENTS

WO    WO 0219749 A1 * 3/2002

OTHER PUBLICATIONS

CCITT, "Recommendation D.231 Charging and Accounting Principles Relating to the User-to-User Information (UUI) Supplementary Service," CCITT FASCICLE, vol. II, No. 1, 1988, pp. 223-224, XP002176920.

Lind, C., "3G TR 23.821 V1.0.1 (Architecture Principles for Release 2000)," $3^{rd}$ Generation Partnership Project, 3GPP, Jul. 2000, pp. 1-62, XP002175634.

3GPP, "3G TS 22.087 V3.1.0," $3^{rd}$ Generation Partnership Project, 3GPP, Dec. 1999, pp. 1-17, XP002176921.

* cited by examiner

METHOD AND NETWORK DEVICE FOR ACCOUNTING CHARGEABLE SIGNALING

FIELD OF THE INVENTION

The present invention relates to a method and system for accounting chargeable signaling in a communication network, such as an IP (Internet Protocol) network.

BACKGROUND OF THE INVENTION

The personal computer and other digital devices are rapidly becoming key communication tools for millions of users worldwide. The importance of digital and data network communications has greatly increased with the explosion of the Internet. While electronic mail is still a dominant method of interactive computer communications, electronic conferencing and IP-based telephony are becoming increasingly attractive. The adoption of packet switching and its merging with circuit switching helps drive this communications migration. There are many reasons for this, among them pricing advantages due to improved source utilization, seamless transmissions between monomedia and multimedia communications, as well as between human-to-computer (e.g. web-based) and interpersonal interactions.

According to current scenarios, service and/or bearer parameters can be negotiated with setup and setup response messages. An IP mobile terminal equipment performs a setup signaling according to the Session Initiation Protocol (SIP) used for initiating calls in IP networks, such as the Internet. SIP can be used to establish multimedia sessions or calls such as Internet telephony, multimedia conferencing and distance learning. SIP supports user mobility, that is the ability of end-users to make and receive calls and access subscribed telecommunication services from any location and the ability of the network to track the location of the user. The first step in the initiation of a call using SIP is to locate a SIP server for the callee. Once the SIP server has been found, the client can invite the callee to join a communication session by transmitting an INVITE message. A successful indication consists of an INVITE message followed by an ACK message.

The INVITE message contains a session description that provides the called party with enough information to join the session. If the callee decides to accept the call, it response with a session description of its own. The session description is based on the Session Description Protocol (SDP) which indicates the media components, the transport protocol, the media format, and IP addresses and ports.

Additionally, in the SIP signaling message such as INVITE and its response message bodies it is possible to carry various contents in the informative part for the called party. Examples of such contents are MIME (Multipurpose Internet Mail Extensions) contents. These MIME contents carried in SIP signaling messages could be, for instance, greeting pictures or voice clips that are presented to the called subscriber when the incoming call is alerted to him. Similarly, in SIP messages there are some header fields informative for the called subscriber, such as the subject header. Due to the outband SIP call signaling via a separately routed control channel, the usage of different chargeable actions is enabled even if the call is never connected, e.g. if the initial setup signaling was not successful. Thus, inter-operator accounting based on an accumulation of chargeable signaling information is not possible for the amount of data carried in signaling messages. In present accounting systems, only call amounts and durations are gathered.

SUMMARY OF THE INVENTION

It is therefore an object of the present invention to provide a method and network device for accounting chargeable information, by means of which the amount of data carried in signaling messages can be obtained.

This object is achieved by a method for accounting chargeable signaling in a communication network, said method comprising the steps of:
  detecting a call signaling message in a network element;
  determining an amount of data carried in said signaling message based on a message description provided in said signaling message;
  selecting a counting function based on said message description; and
  updating said selected counting function according to said determined amount of data.

Additionally, the above object is achieved by a network element having an accounting function for accounting chargeable signaling, said terminal device comprising:
  detecting means for detecting a signaling message routed through or processed by said network element;
  counter means for performing a data accumulation;
  classifying means for determining an amount of data carried in said signaling message and for selecting a counting function of said counter means based on a message description provided in said signaling message; and
  updating means for initiating a data accumulation of said selected counting function according to said determined amount of data.

Accordingly, since the signaling data transferred via the network in signaling messages can be detected and accumulated, an inter-operator accounting or billing can be provided even for signaling messages.

The call processing network element may comprises a call state control function. Thus, the data accumulation is performed in a network element through which setup signaling messages are usually routed. However, any other call processing network element could be used as well.

Preferably, the detected signaling message may be a SIP INVITE message. In this case, the message description may comprise an SIP content type field, content length field and contact field. The amount of data may then be derived from said content length field. The counting function may be selected on the basis of said content type field and/or said contact field.

According to an advantageous development, different counting functions can be provided for different header fields and/or different content type fields of said message description. Thus, an individual accounting or billing function can be provided based on the type or subject of the signaling data.

Furthermore, the content of said signaling message may be classified according to the type of content, and the updating step may be applied only for predetermined types of content. Thereby, a selective accounting operation can be achieved.

The counting function may be arranged to provide accumulated counts for the number of a predetermined content subject used, the number of a predetermined content type used, and/or the data volume. The counts can be separately accumulated for answered calls and non-answered calls.

BRIEF DESCRIPTION OF THE DRAWINGS

In the following, the present invention will be described in greater detail based on a preferred embodiment with reference to the accompanying drawing figures, in which.

DESCRIPTION OF THE PREFERRED EMBODIMENT

Figure 1:
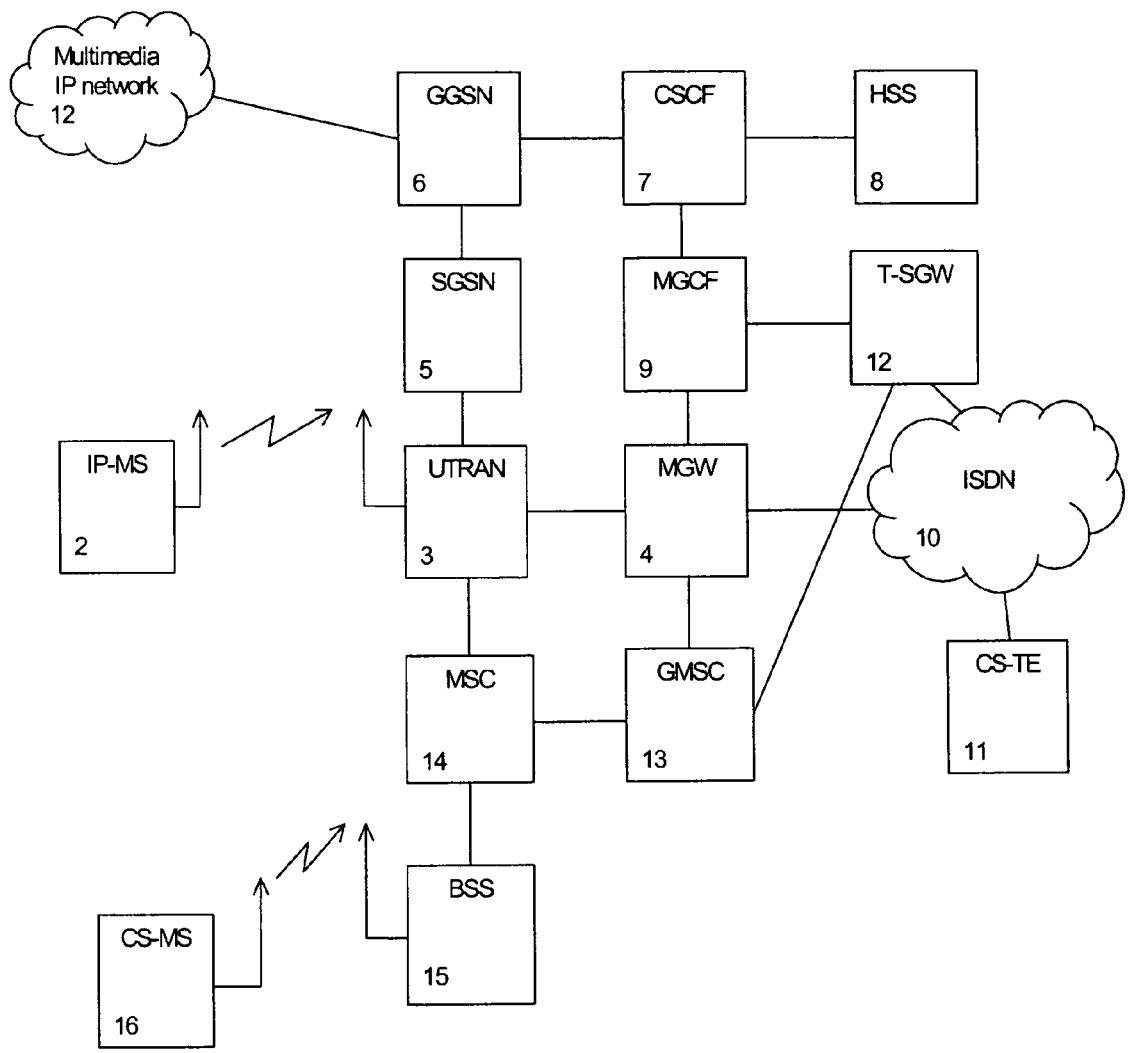
FIG. 1 shows a network system according to the 3GPP ALL IP reference model, wherein a PS multimedia terminal can be connected to a fixed or a mobile CS multimedia terminal.

The preferred embodiment of the present invention will now be described on the basis of an establishment of a connection for a multimedia call in a network environment according to a 3GPP ALL IP reference model, as depicted in FIG. 1.

According to FIG. 1, an IP (Internet Protocol) mobile terminal or station 2 provides a radio-connection to a UMTS Terrestrial Radio Access Network (UTRAN) 3, a circuit-switched mobile station 16 provides a radio-connection to a GSM (Global System for Mobile communications) core network of the UMTS network, and a circuit-switched terminal equipment 11 is connected to a fixed network such as the ISDN (Integrated Services Digital Network) 10.

The UTRAN 3 comprises at least one Radio Network Controller (RNC, not shown) for providing a switching function to e.g. a GPRS (General Packet Radio Services) network comprising a Serving GPRS Support Node (SGSN) 5 having a switching and mobility management function in the GPRS core network of the UMTS network. Furthermore, the SGSN 5 is connected to a Gateway GPRS Support Node (GGSN) 6 which provides an access function to a multimedia IP-based network 12, such as the Internet.

Additionally, the RNC of the UTRAN 3 may established a connection to the CS terminal equipment 11 via the ISDN 10 and a Media Gateway (MGW) 4 arranged for adapting the PS multimedia connection of the UMTS network to the CS connection of the ISDN 10. In particular, the MGW 4 may allow a PS H.323 or a SIP system to interoperate with analogue ISDN terminals such as the CS terminal equipment 11 which may be a H.324 compliant terminal. The gateway functionality of the MGW 4 is addressed e.g. in the ITU-T recommendation H.246 for the case of an interworking of H-series multimedia terminals with H-series multimedia terminals and voice/voice-band terminals.

The MGW 4 is connected to a Media Gateway Control Function (MGCF) 9 which can be connected via a T-SGW 12 to the ISDN 10 or a Gateway Mobile Switching Center (GMSC) 13 of the GSM core network.

Furthermore, the MGCF 9 is connected via a Call State Control Function (CSCF) 7 to a Home Subscriber Server (HSS) 8 comprising a subscriber database in which subscriber data required for mobility management and roaming is stored.

A more detailed description of the functions of the MGW 4, the MGCF 9, the CSCF 7 and related 3GPP ALL IP network elements may be gathered from the corresponding 3GPP Release 4 specification of the 3GPP (Third Generation Partnership Project).

The circuit-switched mobile station 16 may be connected via a Base Station Subsystem (BSS) 15 and at least one Mobile Switching Center (MSC) 14 to the GMSC 13. Then, the GMSC 13 provides access either to the MGW 4 so as to provide a user plane connection, or via the T-SGW 12 to the MGSF 9 so as to provide a control channel for outband control signaling messages.

When a multimedia connection is to be established between e.g. the IP mobile station 2 and the CS terminal equipment 11, an initial outband control signaling is transferred via a control channel routed through the UTRAN 3, the SGSN 5, the GGSN 6, the CSCF 7, the MGCF 9, the T-SGW 12 and the ISDN 10 as a control plane for the setup control signaling. After the initial setup negotiation of the multimedia call, wherein connection parameters of the multimedia connections are negotiated, a user plane connection or bearer is established between the IP mobile station 2 and the CS terminal equipment 11 via the UTRAN 3, the MGW 4 and the ISDN 10, wherein the MGW 4 provides the adaptation or interworking function for adapting the PS connection of the UMTS network to the CS connection of the ISDN 10.

A similar procedure is performed in the event that the IP mobile station 2 is connected to the CS mobile station 16. In this case, the control channel for the initial setup negotiation is routed through the UTRAN 3, the SGSN 5, the GGSN 6, the CSCF 7, the MGCF 9, the T-SGW 12, the GMSC 13, the MSC 14 and the BSS 15. The user plane connection or bearer is then established between the IP mobile station 2 and the CS mobile station 16 via the UTRAN 3, the MGW 4, the GMSC 13, the MSC 14 and the BSS 15.

The initial call control or call setup negotiation via the control channel or plane comprises a setup message in which the calling user proposes certain connection parameters. In an acknowledgement to the setup request, the called terminal accepts at least a part of the requested connection parameters or characteristics. This part is based on terminal characteristics of the called terminal or a default setting or presetting based on user preferences. This negotiation principle may as well be used for negotiating the composition of a multimedia session, i.e. the media components required for the multimedia connection.

Figure 2:
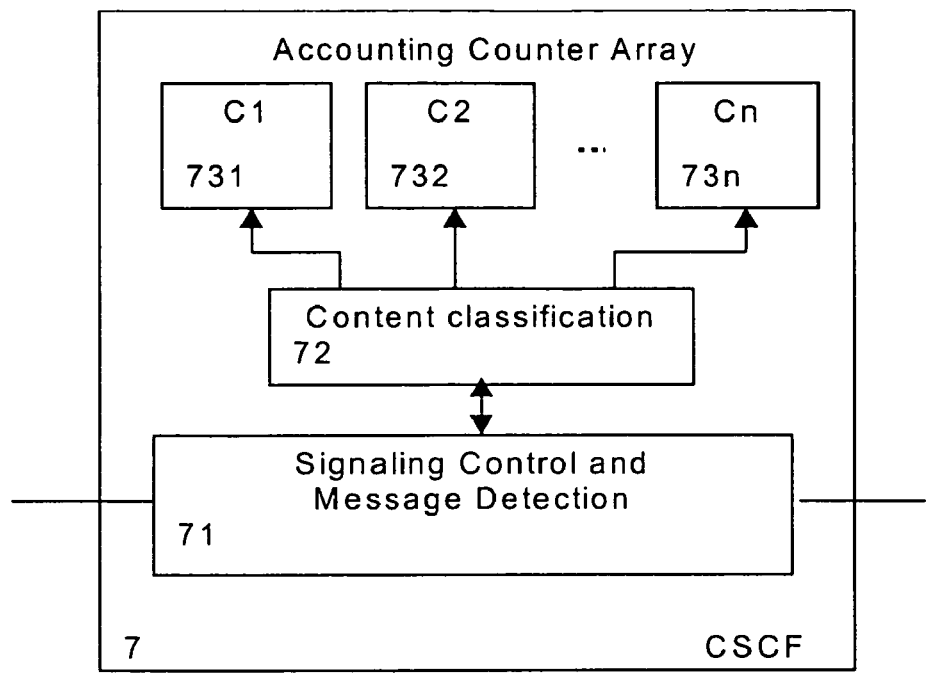
FIG. 2 shows a schematic block diagram of a call processing CSCF function according to the preferred embodiment of the present invention.

FIG. 2 shows a schematic block diagram of the CSCF 7 which comprises a signaling control and message detection function 71 for performing call state control signaling for routing calls through the All IP network shown in FIG. 1. Furthermore, the signaling control and message detection function 71 is arranged to detect a received setup signaling message based on e.g. its header information or session description and to control a content classification function 72 to classify the type and/or subject of the signaling data submitted by the INVITE message. The content classification function 72 may be based on a message storing and field-oriented comparison function with a previously stored information regarding the types and subjects of the data in the setup message.

In particular, the various header field identifiers such as "subject:" and the MIME content types e.g. from the header field "content-type", an entity-header field which indicates the media type of the message-body sent to the recipient, can be used for the classification. To achieve an inter-operator accounting, the CSCF 7 and other switching or routing network elements gather call amounts and durations in accounting countes which may as well be used for various statistics. According to the preferred embodiment, an accounting counter array comprising counters C1 731 to Cn 73n is provided for counting or accumulating data amounts carried in signaling messages such as the SIP INVITE message. In particular, separate counters 731 to 73n are provided for different types or subjects of contents. E.g., there could be counters for different header fields and counters for different MIME content types. The classification function 72 classifies the data contents received in a signaling message according to their type, and initiates and updating function for updating the counters 731 to 73n correspondingly.

The updating may only be initiated for certain types of data. E.g., the SDP content type of the SIP INVITE message could be separated from the rest of the content types.

Figure 3:
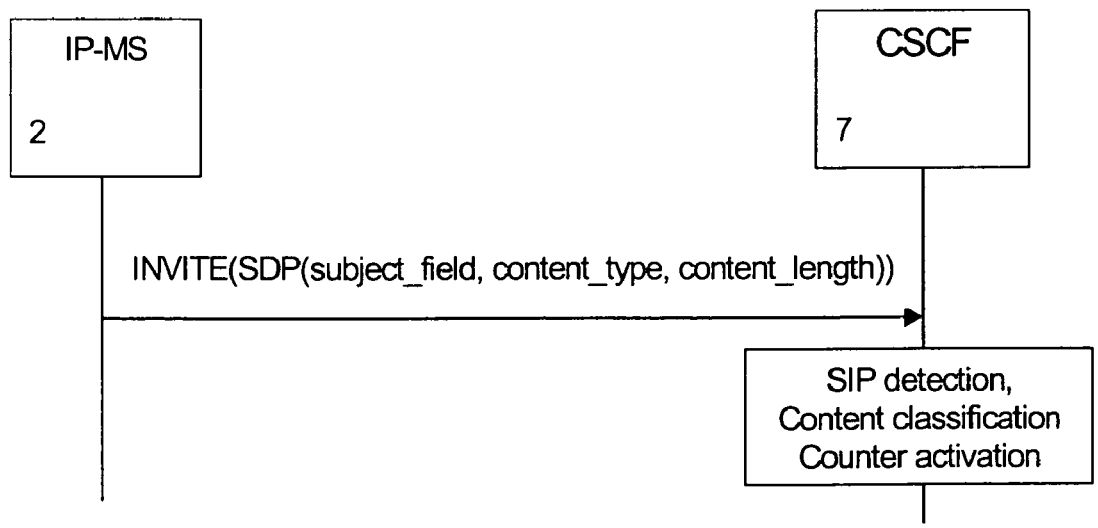
FIG. 3 shows a message signaling diagram for a CS terminated multimedia call.

In the following, a signaling scenario is described with reference to FIG. 3, wherein a connection is established between the IP mobile station 2 of the UMTS network and the CS mobile station 16 of the GSM core network. In particular, FIG. 3 shows a message signaling diagram for a CS terminated multimedia call initiated by the IP mobile station 2. The CSCF 7 receives a setup message (SIP message INVITE) from the IP mobile station 2, which contains a subject field, a content type field and a content length field. At the CSCF 7, a number analysis is performed with respect to an included address information and the name or address of the respective MGCF 9 is derived. Then, the INVITE message is routed to the MGCF 9 which initiates a corresponding reservation of IP and SCN terminations at the MGW 4.

It is important to gather accounting information, i.e. update the counters, if it has been determined that the call is directed to another operators network. Typically, in such situations the CSCF 7 or the MGCF 9 would involve the accounting function for calls outgoing to other operators networks. The accounting function involves e.g. the content classification function 72 and the updating function for updating the counters 731 to 73n correspondingly.

Similarly, if there is an incoming call from another operator's all-IP network (IP multimedia network) or circuit switched network, the MGCF or the CSCF in the receiving network must involve the accounting function.

Furthermore, the signaling control and message detection function 71 of the CSCF 7 detects the SIP message and checks if a subject field and content type and length fields are included. If so, the signaling control and message detection function 71 controls the content classification function 72 to determine the data amount and classify the message data based on the subject, content type and/or content length fields, to select one of counters or counting functions 731 to 73n based on the result of classification, and to initiate an updating of the selected counter according to the determined amount of data, such that a corresponding charging or accounting information is stored or accumulated in the accounting counter array.

Thus, the present accounting function enables a detection of applications run even if the called subscriber has not answered the call and no connection has been established. Since such actions or applications can be detected by the above procedure, a corresponding updating of the signaling accounting counters 731 to 73n can be assured.

The counters 731 to 73n can be arranged to provide a structure for separately counting or accumulating the number of usages of predetermined message fields, the volume of data carried in predetermined message fields (such as various message header fields like "subject:"), the number of usages of subjects, the number of usages of predetermined types of contents, the volume of data carried in predetermined types of contents and the total data volume. Moreover, separate counting functions can be provided for answered and non-answered calls (i.e. successful and unsuccessful cases).

The signalling messages are passed to the content classification means 72 when it has been determined that the call is answered or that is not answered e.g. due to busy or no-answer condition. This means, for example, that a call state model instance in the CSCF 7 or in the MGCF 9 hold the signalling message information significant for the content classification function 72 and accounting function, at least until it has been determined whether the call is completed to speech-state. Only thereafter this information is forwarded to the content classification function 72 or accounting function. It can also be conceived that the content classification function 72 are aware of the call state model such that the content classification function 72 can refrain from updating the counters until the completion status (e.g. answering) of the call has been determined.

In this embodiment it is possible to have separate counters for unanswered calls and separate counters for answered calls. Likewise, it is possible to have the option that either for unanswered or answered calls the counters are not updated.

In another embodiment of the invention, the accounting means involving the content classification function 72 and the accounting counter array of the counters 731 to 73n are implemented into a proxy server separate from the CSCFs. The proxy server is responsible for routing SIP signalling messages. For instance, there could be at least one border router for routing IP packets carrying SIP signalling messages (that are in turn held within TCP or UDP messages) between the CSCFs or other equivalent call processing nodes (such as MGCFs or general SIP call processing servers) of network parts or networks of different operators OP1 and OP2, as shown in the message flow diagram of FIG. 4.

Figure 4:
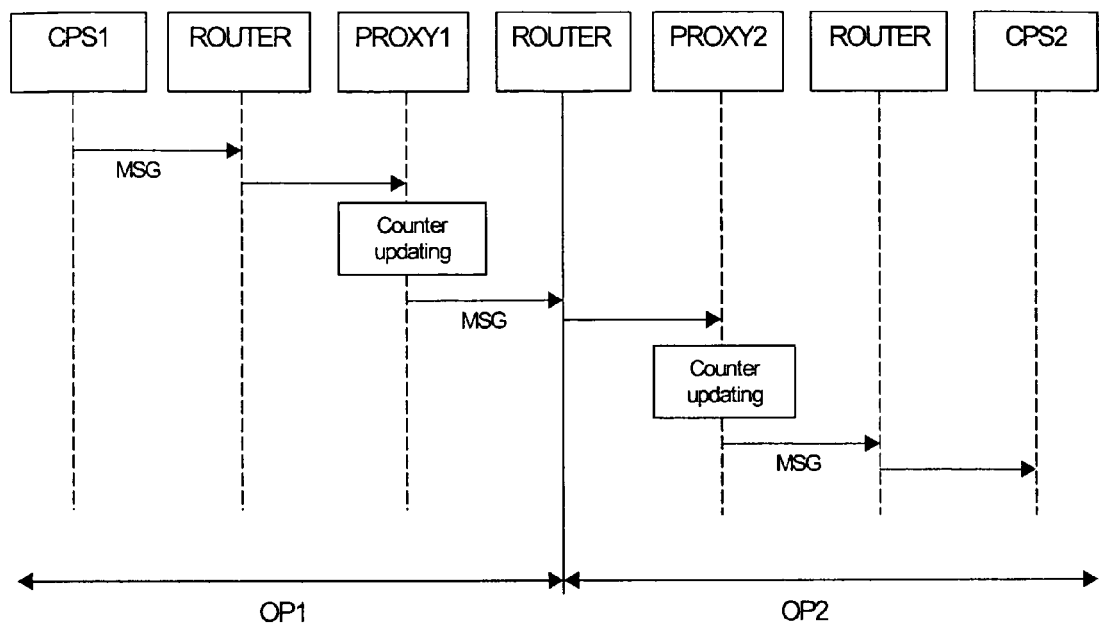
FIG. 4 shows a message flow diagram indicating a message routing between network parts of different network operators.

According to FIG. 4, a border router could detect the SIP signalling messages MSG based on IP addresses or message contents and route them to proxy servers PROXY1 and PROXY2 involving the accounting means. For instance, whenever there is an inbound SIP signalling message MSG from a call processing node CPS1 of the first operator OP1 to a call processing node CPS2 of the second operator OP2, it is forwarded by the border router to the proxy server PROXY1 containing the accounting means for inbound SIP message to the second operators network. Similarly, there could be separate proxy servers for inbound and outbound traffic from an operator's network.

For instance, there is an outbound SIP signalling message MSG from the first operator's network to the second operators network. The SIP signaling message MSG is first transmitted from the first operator's call processing node CPS1 via a network router to the first operators proxy server PROXY1 for outbound SIP signalling messages. The first operators proxy server PROXY1 involves the accounting means for the first and second operator interface at the first operator side. From the first operator's proxy server PROXY1 the SIP signalling message MSG is transmitted to the second operator's proxy server PROXY2. The second operator's proxy server PROXY2 involves the accounting means for the first and second operator interface at the second operator side. From the second operator's proxy server PROXY2 the SIP signalling message MSG is transmitted to the second operator's call processing node CPS 2 e.g. via a network router.

This embodiment applies best for the cases where the proxies PROXY1 and PROXY2 are not aware of the call state. Whenever awareness of the call state is required, the accounting means are best supported in the call processing nodes CPS1 and CPS2, such as the CSCF 7, the MGCF 9 or any general SIP call processing server (described in RFC 2543).

It should be appreciated that the invention is not only applicable for SIP, but also for any signalling protocol used to set-up multimedia sessions over IP network, wherein it is possible to, for instance, carry informative message contents in the signalling message. The invention would also apply in the cases where e.g. ITU-T Q.931 signalling messages associated with H.323 are used to carry such informative message contents.

It is noted that the present invention is not restricted to the preferred embodiment described above, but can be implemented in call-processing network element and any network, where signaling messages are provided for setting up a connection. Any suitable message description can used for classifying the data amounts and deriving the data amount. The preferred embodiment may thus vary within the scope of the attached claims.

The invention claimed is:

1. A method, comprising: detecting a call signaling message in a network element; determining an amount of data carried in said call signaling message based on a call message description provided in said call signaling message, said call signaling message comprising a session initiation protocol message; selecting a counting function based on said call message description, wherein said selecting said counting function comprises selecting said counting function from different counting functions provided for at least one of different header fields and different content type fields of said call message description; storing the determined amount of data in the selected counting function; and updating said selected counting function according to said determined amount of data to account a chargeable signaling in a packet-switched communication network.

2. A method according to claim 1, wherein said detecting said call signaling message comprises detecting said call signaling message in said network element comprising a call state control function.

3. A method according to claim 1, wherein said detecting said call signaling message comprises detecting said call signaling message comprising a call setup message.

4. A method according to claim 3, wherein said detecting said call signaling message further comprises detecting said call signaling message comprising said call setup message comprising a session initiation protocol INVITE message.

5. A method according to claim 4, wherein said determining said amount of data comprises determining said amount of data carried in said call signaling message based on said call message description comprising a content type field, a content length field, and a contact field.

6. A method according to claim 5, wherein said determining said amount of data further comprises determining said amount of data derived from said content length field.

7. A method according to claim 5, wherein said selecting said counting function comprises selecting said counting function on a basis of at least one of said content type field and said contact field.

8. A method according to claim 1, further comprising: classifying a content of said call signaling message according to a type of content; and applying said updating said selected counting function according to said determined amount of data only for predetermined types of content.

9. A method according to claim 1, wherein said selecting said counting function comprises selecting said counting function configured to provide accumulated counts for at last one of a number of a predetermined content subject used, a number of a predetermined content typed used, and a data volume.

10. A method according to claim 9, wherein said selecting said counting function further comprises selecting said counting function configured to provide said accumulated counts that are separately accumulated for answered calls and non-answered calls.

11. An apparatus, comprising: a controller configured to detect a signaling message routed through or processed by said apparatus; a counter configured to perform a data accumulation; and a content classifier configured to determine an amount of data carried in said signaling message and configured to select a counting function of said counter based on a call message description provided in said signaling message, said call signaling message comprising a session initiation protocol message, wherein said counting function selection comprises selecting said counting function from different counting functions provided for at least one of different header fields and different content type fields of said call message description, wherein said controller is further configured to update a data accumulation of said selected counting function according to said determined amount of data to account a chargeable signaling in a packet-switched communication network, and wherein the controller, the counter, and the content classifier are separate elements.

12. An apparatus according to claim 11, wherein said apparatus comprises a call state control function.

13. An apparatus according to claim 11, wherein said signaling message comprises a call setup message.

14. An apparatus according to claim 13, wherein said call setup message comprises a session initiation protocol INVITE message.

15. An apparatus according to claim 14, wherein said call message description comprises a content type field, a content length field, and a contact field.

16. An apparatus according to claim 15, wherein said content classifier is further configured to derive said amount of data from said content length field.

17. An apparatus according to claim 15, wherein said content classifier is further configured to select said counting function on a basis of at least one of said content type field and said contact field.

18. An apparatus according to claim 11, wherein said content classifier is further configured to classify content of said signaling message according to a type of content; and said controller is further configured to initiate said data accumulation only for predetermined types of content.

* * * * *